United States Patent
Ahmad et al.

(10) Patent No.: US 9,032,181 B2
(45) Date of Patent: May 12, 2015

(54) SHORTCUT INPUT/OUTPUT IN VIRTUAL MACHINE SYSTEMS

(75) Inventors: Irfan Ahmad, Mountain View, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1129 days.

(21) Appl. No.: 12/783,205

(22) Filed: May 19, 2010

(65) Prior Publication Data

US 2010/0299667 A1  Nov. 25, 2010

Related U.S. Application Data

(60) Provisional application No. 61/179,612, filed on May 19, 2009.

(51) Int. Cl.
*G06F 12/10* (2006.01)

(52) U.S. Cl.
CPC ...... *G06F 12/1018* (2013.01); *G06F 2212/656* (2013.01); *G06F 12/1036* (2013.01); *G06F 12/109* (2013.01); *G06F 2212/152* (2013.01)

(58) Field of Classification Search
CPC .............................................. G06F 2212/656
USPC .......................................................... 711/203
See application file for complete search history.

(56) References Cited

U.S. PATENT DOCUMENTS

| | | | |
|---|---|---|---|
| 6,075,938 A | 6/2000 | Bugnion | |
| 6,789,156 B1 | 9/2004 | Waldspurger | |
| 7,636,800 B2 * | 12/2009 | Ben-Yehuda et al. | 710/28 |
| 7,840,537 B2 | 11/2010 | Gokhale et al. | |
| 7,921,077 B2 | 4/2011 | Ting et al. | |
| 8,099,571 B1 | 1/2012 | Driscoll et al. | |
| 8,135,930 B1 | 3/2012 | Mattox et al. | |
| 8,364,910 B2 * | 1/2013 | Wilkerson et al. | 711/152 |
| 2001/0016879 A1 * | 8/2001 | Sekiguchi et al. | 709/319 |
| 2003/0110205 A1 * | 6/2003 | Johnson | 709/104 |
| 2004/0107225 A1 | 6/2004 | Rudoff | |
| 2005/0083862 A1 | 4/2005 | Kongalath | |
| 2007/0050423 A1 | 3/2007 | Whalen et al. | |
| 2007/0061487 A1 | 3/2007 | Moore et al. | |
| 2007/0260815 A1 | 11/2007 | Guha et al. | |
| 2008/0005141 A1 | 1/2008 | Zheng et al. | |
| 2008/0059726 A1 | 3/2008 | Rozas et al. | |
| 2008/0215796 A1 | 9/2008 | Lam et al. | |
| 2008/0294696 A1 | 11/2008 | Frandzel | |

(Continued)

OTHER PUBLICATIONS

Miloś, et al., "Satori: Enlightened Page Sharing," Proceedings of 2009 USENIX Technical Conference, Jun. 17, 2009. Also available at <http://www.usenix.org/event/usenix09/tech/full_papers/milos/milos_html/index.html>, visited Aug. 5, 2010.

(Continued)

*Primary Examiner* — Kalpit Parikh

(57) ABSTRACT

Read requests to a commonly accessed storage volume are conditionally issued, depending on whether or not a requested data block is already stored in memory from a prior access or to be stored in memory upon completion of a pending request. A data structure is maintained in memory to track physical memory pages and to indicate for each physical memory page the corresponding location in the storage volume from which the contents of the physical memory were read and the number of virtual memory pages that are mapped thereto.

20 Claims, 8 Drawing Sheets

(56) References Cited

U.S. PATENT DOCUMENTS

| | | |
|---|---|---|
| 2009/0254609 A1 | 10/2009 | Wideman et al. |
| 2009/0287901 A1 | 11/2009 | Abali |
| 2010/0042790 A1 | 2/2010 | Mondal et al. |
| 2010/0057750 A1 | 3/2010 | Aasted et al. |
| 2010/0070725 A1 | 3/2010 | Prahlad et al. |

OTHER PUBLICATIONS

Koller, et al., "I/O Deduplication: Utilizing Content Similarity to Improve I/O Performance," Proceedings of FAST '10: 8th USENIX Conference on File and Storage Technologies, Feb. 26, 2010, pp. 211-224.

Patent Cooperation Treaty "Notification of Transmittal of the International Search Report and the Written Opinion of the International Searching Authority, or the Declaration" mailed in PCT/US2010/035409 on Sep. 6, 2010.

Blosky, W. et al.; Single Instance Storage in Windows 2000; Microsoft Research; Baider Technology Group, Inc.; pp. 1-12.

Hong, B. et al.; Duplicate Data Elimination in a SAN File System; 2004; pp. 101-114.

Koller, R. et al.; I/O Deduplication: Utilizing Content Similarity to Improve I/O Performance; Proceedings of FAST '10: 8th USENIX Conference on File and Storage Technologies; Feb. 26, 2010. pp. 211-224.

Quinlan, S. et al.; Venti: A New Approach to Archival Storage; Proceedings of FAST 2002 Conference on File Storage Technologies; USENIX Association; Monterey, CA, USA; Jan. 28-30, 2002; pp.

Zhu, B. et al.; Avoiding the Disk Bottleneck in the Data Domain Deduplication File System; FAST '08: 6th USENIX Conference on File and Storage Technologies; USENIX Association; pp. 269-282.

Douceur, J. et al; Reclaiming Space from Duplicate Files in a Serverless Distributed File System; Microsoft Research, Microsoft Corporation; Jul. 2002 Technical Report MSR-TR-2002-30; pp. 1-14.

\* cited by examiner

Page Tracking Table
175

| Target Reference (baseDisk, Offset) 410 | MPN 412 | Ref Count 414 | Pending 416 |
|---|---|---|---|
| (x0001.vmdk, 5) | 0x66 | 2 | 0 |
| (x0001.vmdk, 24) | 0x83 | 0 | 1 |
| ⋮ | ⋮ | ⋮ | ⋮ |
|  |  |  |  |

Figure 4

SHORTCUT INPUT/OUTPUT IN VIRTUAL MACHINE SYSTEMS

CROSS-REFERENCE TO RELATED APPLICATIONS

This application claims the benefit of U.S. Provisional Patent Application Ser. No. 61/179,612, filed May 19, 2009. The entire content of the provisional application is incorporated by reference herein.

BACKGROUND

A virtual machine (VM) provides an environment in which an operating system (OS) may execute with apparent control of a dedicated physical machine. Multiple VMs may execute on a common hardware machine, and each VM may operate with protection and isolation from other VMs executing on the common hardware machine. Each VM typically encapsulates a complete executing state for a corresponding OS, including both user-level applications and kernel-mode OS services.

A VM may execute an instance of a conventional desktop environment commonly found on a desktop computer. A virtual desktop infrastructure (VDI) system is a system of VMs specifically configured to execute instances of a desktop environment on the common hardware machine. A client device may access a specific instance of the desktop environment within the VDI system via a network connection to the common hardware machine. The client device is then able to present the desktop environment to a user from any location with appropriate network access.

Each instance of the desktop environment comprises a desktop OS and related applications. The desktop OS and applications reside in a mass storage volume associated with the instance. Each instance is associated with a unique mass storage volume that provides a private storage space similar to that provided by a hard disk attached to a desktop computer. The mass storage volume may be derived from a shared, read-only "base disk" and a unique set of difference blocks associated with the mass storage volume.

The mass storage volumes of different instances of the desktop environment reside on a mass storage device. The mass storage device is conventionally implemented using one or more magnetic hard disk drives. However, any form of mass storage media may be used. For example, in modern computer systems, the mass storage media may comprise a solid-state drive (SSD) or an array of SSDs.

When a plurality of desktop environments is started by the VDI system, each desktop environment individually boots a respective instance of the OS on an apparently private hardware machine, provided by an associated VM. In actuality, however, the common hardware machine is performing all necessary steps and instructions to boot each of the plurality of desktop environments. A "boot storm" refers to a sharp and sometime crippling rise in resource utilization with respect to the common hardware machine that occurs when the plurality of desktop environments attempt to simultaneously boot within their respective VMs. The boot storm is typically characterized by a sharp rise in input/output (I/O) requests, disk access requests, and memory allocation requests. When each desktop environment boots, a specific set of commonly used disk blocks is read from the mass storage device into system memory within the common hardware machine. Many of the commonly used disk blocks are data segments of the OS. In a conventional VDI system, each disk block may be read from the mass storage device and then stored in physical memory pages of the system memory on the common hardware machine. Each physical memory page is then privately mapped to a VM that requested the disk block. As a result, duplicate copies of each commonly used block may be requested from the mass storage system and stored redundantly in system memory, leading to I/O and storage inefficiencies.

For example, in a conventional VDI system, if N instances of the desktop environment are booted on the common hardware machine, then N copies of each block from the set of commonly used blocks are separately requested from the mass storage system and initially stored as N separate copies within the system memory. Similarly, if M different users launch a particular common application from their respective virtual desktop environment, then M separate requests for each block used by the application are separately transmitted to the mass storage system and related data is stored in M separate blocks in system memory. In the boot storm scenario, as well as the common application launch scenario, significant memory and I/O capacity is utilized to support multiple VMs booting and executing multiple instances of the desktop environment. Unfortunately, much of this memory and I/O capacity is utilized redundantly, and therefore limits advantages otherwise gained by a VDI systems architecture.

Therefore, what is needed in the art is a technique for reducing system resource utilization in VDI and other similar systems.

SUMMARY

One or more embodiments of the present invention provide methods and system for conditionally issuing read requests to a commonly accessed storage volume, depending on whether or not a requested data block is already stored in memory from a prior access or to be stored in memory upon completion of a pending request. As a result, the total number of input/output requests issued to a storage volume can be significantly reduced, especially in a VDI system where a large number of reads made by different virtual machines supporting the VDI system are to the same address in the storage volume.

A method of processing read I/O requests in a computer system having applications running therein, according to an embodiment of the invention, employs a tracking data structure for a first group of machine memory pages, each having at least two virtual memory pages mapped thereto, and a second group of machine memory pages, each having only one virtual memory page mapped thereto, wherein the tracking data structure indicates, for each of the machine memory pages, a corresponding location in a storage volume from which its contents were read or are being read. According to this method, in response to a read request, the tracking data structure is used to determine that a machine memory page in the first group or the second group contains or will contain data stored in a location of the storage volume indicated in the read request, and a virtual memory page associated with the read request is mapped to this machine memory page. Further, in response to a memory write request to a machine memory page of either the first group or the second group, the contents of the associated machine memory is copied to a new machine memory page, and a virtual memory page associated with the memory write request is mapped to the new machine memory page.

A method of processing read I/O requests in a computer system having applications running therein, according to another embodiment of the invention, employs a tracking data structure for a first group of machine memory pages, each having at least two virtual memory pages mapped thereto, a second group of machine memory pages, each having only one virtual memory page mapped thereto, and a third group of machine memory pages, each having no virtual memory pages mapped thereto, wherein the tracking data structure indicates, for each of the machine memory pages, a corresponding location in a storage volume from which its contents were read or are being read, and a reference count indicating how many virtual memory pages are mapped to the machine memory page. According to this method, in response to a read request, a virtual memory page associated with the read request is mapped to a machine memory page in one of the first, second, and third groups, and the reference count associated with the machine memory page is incremented.

A method of processing read I/O requests in a computer system having virtual machines running therein, according to yet another embodiment of the invention, employs a tracking data structure for a set of machine memory pages, wherein the tracking data structure indicates, for each of the machine memory pages, a corresponding location in a storage volume from which its contents were read or are being read, a reference count indicating how many virtual memory pages are mapped to the machine memory page, and a pending status flag indicating whether or not a read from the storage volume is pending. This method includes the steps of, in response to a read request, determining using the tracking data structure if one of the machine memory pages being tracked contains or will contain data stored in a location of the storage volume indicated in the read request, and if there is a machine memory page being tracked that contains or will contain data stored in a location of the storage volume indicated in the read request, mapping a guest physical memory page associated with the read request to the machine memory page, and if there is no machine memory page being tracked that contains or will contain data stored in a location of the storage volume indicated in the read request, issuing a request to the storage volume for the data stored in the location of the storage volume indicated in the read request, mapping a guest physical memory page associated with the read request to the machine memory page in which the requested data will be stored, and marking the guest physical memory page associated with the read request with a page sharing hint.

A computer system according to an embodiment of the invention includes a host platform for virtual machines and a storage volume connected thereto. The host platform for the virtual machines includes one or more processors and system memory having stored therein a tracking data structure for a first group of machine memory pages, each having at least two virtual memory pages mapped thereto, a second group of machine memory pages, each having only one virtual memory page mapped thereto, and a third group of machine memory pages, each having no virtual memory pages mapped thereto. The tracking data structure indicates, for each of the machine memory pages, a corresponding location in a storage volume from which its contents were read or are being read, and a reference count indicating how many virtual memory pages are mapped to the machine memory page, and a pending status flag indicating whether or not a read from the storage volume is pending. A read request issued by any of the virtual machines is conditionally issued to the storage volume based on this tracking data structure.

Other embodiments include, without limitation, a computer-readable storage medium that includes instructions that enable a processing unit to implement one or more aspects of the disclosed methods.

BRIEF DESCRIPTION OF THE DRAWINGS

FIG. 4 illustrates a page tracking table configured to include at least a reference count and a pending status bit for each tracked page, according to one embodiment of the invention.

DETAILED DESCRIPTION

Figure 1:
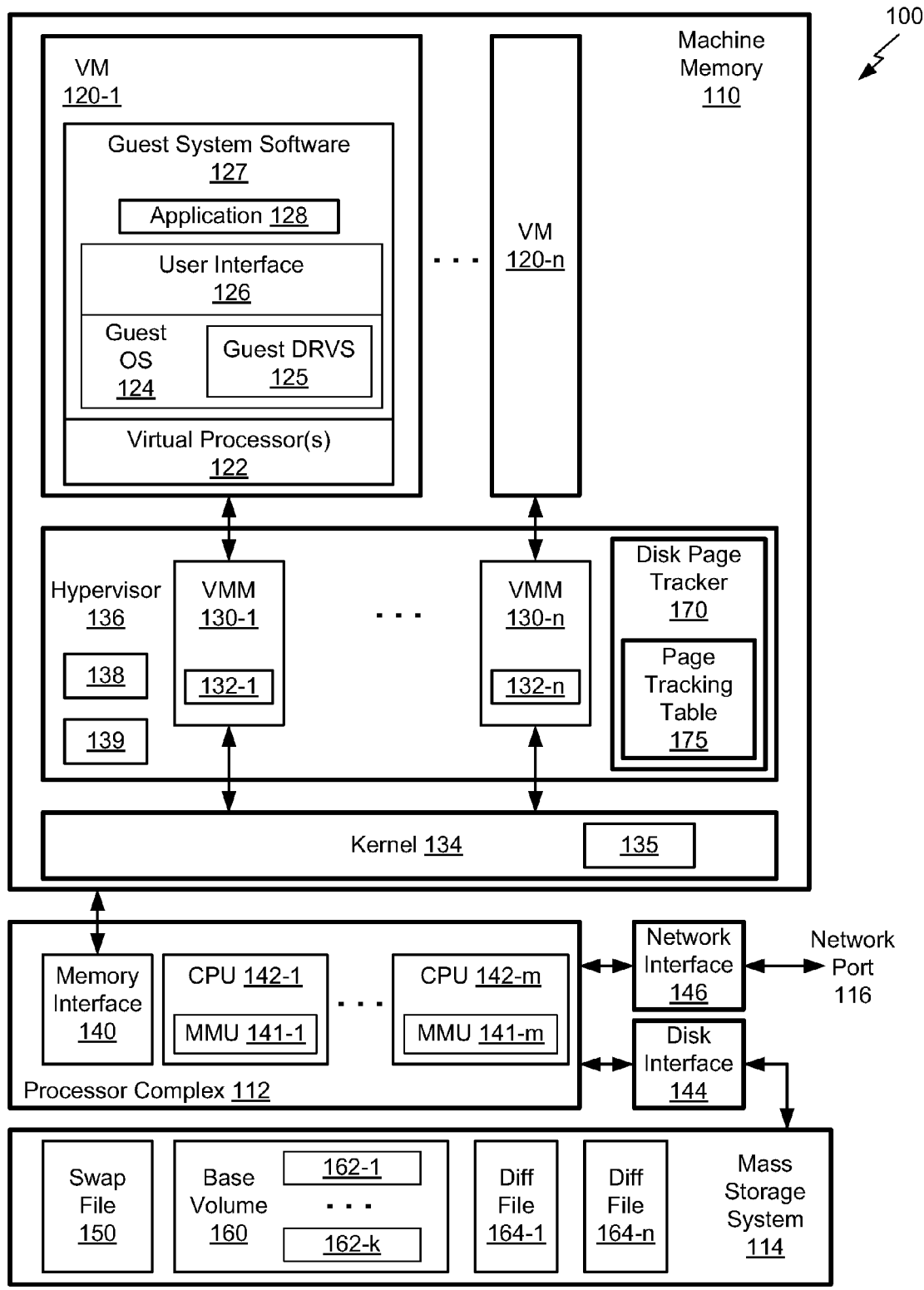
FIG. 1 is a block diagram illustrating a computer system configured to implement one or more aspects of the present invention.

FIG. 1 is a block diagram illustrating a computer system 100 configured to implement one or more aspects of the present invention. In one embodiment, the computer system 100 is configured to implement a virtual desktop infrastructure (VDI) system, whereby state for a plurality of different instances of the virtual desktop environment resides in machine memory 110 and processing for the different instances is performed by a processor complex 112. The computer system 100 includes processor complex 112, machine memory 110, and a mass storage system 114. The processor complex 112 may be coupled to the machine memory 110 via any technically feasible electrical interface, such as a dynamic random access memory (DRAM) interface. In other configurations, the processor complex 112 may be coupled to machine memory 110 via an intermediary interconnect, such as industry standard HyperTransport (TM), PCI-Express (TM), Intel (TM) QuickPath Interconnect (QPI), or any other technically feasible transport interface. Details regarding the intermediary interconnect are not shown herein for the sake of clarity. The processor complex 112 may be coupled to mass storage system 114 via a native storage interface, such as serial advanced technology attachment (SATA), serial attached small computer system interface (SAS), or any other technically feasible native storage interface. In other configurations, the processor complex 112 is coupled to mass storage system 114 via a network enabled storage interface such as Fibre Channel, internet small computer system interface (iSCSI), or any other technically feasible network enabled storage interface.

The processor complex 112 includes, without limitation, a memory interface 140 and one or more central processing units (CPU) 142-1 through 142-m. The memory interface 140 is configured to couple machine memory 110 to the one or more CPUs 142. Each one of the one or more CPUs 142 is configured to execute program instructions stored within machine memory 110. The program instructions are organized as software modules that may be stored for execution within machine memory 110. Each one of the one or more CPUs 142 include a memory management unit (MMU) 141 configured to perform, without limitation, translation of addresses, such as guest physical addresses to machine addresses, or nested translations mapping guest virtual addresses to guest physical addresses to machine addresses. A disk interface 144 and a network interface 146 are coupled to the processor complex 112. The disk interface 144 is configured to couple the mass storage system 114 to the one or more CPUs 142. The disk interface 144 may include implementation specific functionality related to controlling disk systems. Such functionality may include, for example, control for redundant array of independent disks (RAID) and caching. The mass storage system 114 may comprise any technically feasible storage elements, such as magnetic disk drives, solid state drives, or any other elements configured to read and write data for persistent storage. The network interface 146 is configured to couple network port 116 to the one or more CPUs 142. The network interface 146 is configured to couple network port 116 to the one or more CPUs 142 within processor complex 112. The network interface may include any functionality required to transmit and receive data packets via the network port 116. In one configuration, the network port 116 is an industry standard Ethernet port.

Machine memory 110 has stored therein a kernel 134, a hypervisor 136, and virtual machines (VMs) 120, which are used by the processor complex 112 to provide instances of a desktop environment as part of the overall VDI system. The hypervisor 136 is a software virtualization layer configured to provide a runtime environment for the VMs 120 and to execute at least one virtual machine monitor (VMM) 130 that is associated with a corresponding one of the VMs 120. Each one of the VMs 120 is associated on a one-to-one basis with one of the VMMs 130. The hypervisor 136 includes a sharing module 138 that is configured to implement a page sharing mechanism for sharing pages of memory that contain identical data. Page sharing is described in greater detail below. The hypervisor 136 also includes an orphan cache 139 that is configured to retain pages of memory corresponding to blocks of disk data that may be requested in future disk block requests but otherwise are not referenced by a client process.

As shown, VM 120-1 includes one or more virtual processors 122, and guest system software 127. An application 128 may launch and execute according to a conventional run time model for a conventional user-space or kernel-space application for the guest system software 127. In one embodiment, the guest system software 127 includes a guest operating system (OS) 124, such as a commodity operating system. The guest system software 127 also includes a user interface 126, such as a window management system. The guest OS 124 is conventionally configured to provide process control, memory management, and other services required by the application 128 and to present a desktop environment to a user. The guest OS 124 includes guest drivers (DRVS) 125 configured to manage corresponding virtual devices (not shown) accessible via the virtual processor 122. The virtual devices are implemented in software to emulate corresponding system hardware components of an actual hardware processor system. The virtual devices may include, without limitation, a graphics frame buffer, a network interface, a mass storage interface, peripheral devices, and system memory. During normal execution, the application 128 generates load and store requests targeting a virtual address space, organized as guest virtual page numbers (GVPNs). A request to a GVPN within the guest virtual address space may be mapped to a corresponding guest physical address and guest physical page number (GPPN) by the emulated MMU function within the virtual processor 122. Guest physical memory is organized as distinct units, called pages, each with a corresponding, unique GPPN. The application 128 and the guest system software 127 may generate I/O requests, such as I/O block requests to the mass storage system 114. VM 120-1 may implement virtual direct memory access (DMA), enabling its virtual storage devices to directly access GPPNs in response to I/O requests from the guest OS 124.

Each one of the VMs 120 may have a substantially identical internal structure to VM 120-1. Each one of the VMs 120 may also have an independent physical address space, and therefore a given GPPN within one VM 120 is independent of the same GPPN within a different one of the VMs 120. Each GPPN references a page of guest physical memory, which is mapped to a page of machine memory that is referenced via a machine page number (MPN). Each GPPN may alternatively be backed by a machine memory page in a remote host, or backed by a location in a swap file 150 residing within the mass storage system 114. In some cases, a GPPN may not be mapped to or backed by any page of machine memory or swap file location. More than one GPPN may map to a common, shared MPN.

Each mapping to a shared MPN is marked with a "copy on write" (COW) attribute. "Copy on write" describes a well known technique in the art in which mappings to a particular page are marked read-only so that when the page is written to, an exception is triggered, and an associated exception handler is configured to cause the page to be copied to a new location in memory, which is then written to according to the original write request. In the context of page sharing, a plurality of GPPNs may be mapped to a single shared memory page, for example. The page sharing is transparent to the guest so that from the guest's perspective they have their own copy of the data. When a guest attempts to write the shared page, however, it is copied, and the write is directed to the newly created copy of the page, which is then "owned" by (i.e., mapped to) only that guest. Contents of U.S. Pat. Nos. 6,789,156 and 7,620,766 relating to read-only mappings, COW, content-based deduplication, and accelerated comparisons by hashing, are hereby incorporated by reference.

In general, a VMM provides an interface between a VM and a host runtime environment. The host runtime environment may be a conventional operating system or a kernel configured to manage hardware elements and overall operation of the computer system 100 and thereby provide system services to the VMM. Alternatively, the host runtime environment may be any technically feasible software module configured to manage the computer system 100 and thereby provide system services to the VMM. The VMM provides access to hardware devices and system services to enable the VM to emulate an apparent hardware system via the virtual processor 122.

In one embodiment, the VMM 130-1 is configured to provide a software interface between VM 120-1 and the kernel 134. In other embodiments, the VMM 130-1 may be configured to provide an interface between VM 120-1 and a host operating system (not shown). The VMM 130-1 includes a GPPN-to-MPN map 132-1, used to translate guest physical addresses generated by VM 120-1 into corresponding machine addresses that may be used to access data stored in machine memory 110. Each VMM 130-1 through 130-$n$ includes a respective GPPN to MPN map 132. In one embodiment, GPPN-to-MPN maps 132-1 through 132-$n$ are managed by the kernel 134.

The kernel 134 is configured to manage certain hardware and software resources within the processor complex 112. In particular, the kernel 134 schedules and manages processes VM 120-1 through 120-$n$, and VMM 130-1 through VMM 130-$n$, executing on the one or more CPUs 142. The kernel 134 includes at least one memory management table 135, configured to maintain each GPPN to MPN mapping for accessing machine memory 110. The memory management table 135 includes mappings for each GPPN to MPN map 132-1 through 132-$n$. In this way, the kernel has a global view of all guest physical address to machine address mappings.

The total storage configured for all guest physical address spaces for VMM 130-1 through VMM 130-$n$ may exceed the total available storage within machine memory 110. The kernel 134 implements a memory paging system that swaps selected pages of memory between machine memory 110 and the swap file 150 within the mass storage system 114. Any technically feasible technique may be used to page data between machine memory 110 and the swap file 150, residing within a persistent storage system, such as the mass storage system 114. In addition, data compression techniques may be used to present a virtual memory space that is larger than the machine memory 110. Techniques such as ballooning may be used to trigger guest-level memory reclamation such as page swapping. Furthermore, any technically feasible technique may be implemented to select a page to be swapped from machine memory 110 to a swap file and vice versa. When a page of memory is swapped from machine memory 110 to the swap file 150, the memory management table 135 is updated to reflect a change in disposition of the contents of a corresponding GPPN as being in the swap file 150 rather than resident in machine memory 110. Similarly, when a page within the swap file 150 is swapped into machine memory 110, the memory management table 135 may be updated to reflect another change in disposition for the contents of a corresponding GPPN as being resident in machine memory 110 rather then in the swap file 150. In certain embodiments, the VMM 130 intercepts MMU instructions from the guest OS 124 to enable the kernel 134 to configure MMUs 141 to perform direct GVPN to MPN mappings for high performance memory access from each corresponding VM 120. For example, certain MMU implementations allow nested mappings, enabling the MMU to perform direct GVPN to MPN mappings for high performance access from each corresponding VM 120.

The mass storage system 114 includes a base volume 160, configured to include storage blocks 162-1 through 162-$k$. The base volume 160 is a reference disk image that includes a generic image of the guest system software 127, the application 128, and any other shared software modules. The base volume may also include commonly used data files. A virtual disk volume is generated and presented to a VM 120, based on the base volume 160 and on any modifications to specific blocks 162 residing within the base volume 160. Modifications to specific blocks 162 are stored in a specific difference file 164, which is associated with a corresponding VM 120. Initially, each virtual disk volume presented to each VM is substantially identical to the base volume 160. However, during the normal course of execution, a given VM 120 may write one or more blocks within a corresponding virtual disk volume, triggering a copy on write (COW) for each one of the one or more blocks being written. The process of writing a block, via COW, to the virtual disk volume "specializes" the block for the virtual disk volume. Specialized block data is stored within a corresponding difference file 164, leaving the base volume 160 unchanged. For example, VM 120-1 may write block 162-$k$ of the virtual disk volume, thereby specializing block 162-$k$. Thereafter, data from the specialized block 162-$k$ will be returned when read by VM 120-1. VM 120-$n$ is presented with an independent and private virtual disk volume. VM 120-$n$ may independently specialize block 162-$k$ within its corresponding virtual disk volume, whereby corresponding write data is stored in difference file 164-$n$.

By generating a virtual disk volume for each corresponding VM 120 from base volume 160 and a difference file 164, overall required storage within the mass storage system 114 may be substantially reduced. Simultaneously, each VM 120 is presented an apparently independent, private, and writable instance of the base volume 160. This technique of generating and presenting virtual disk volumes to the VMs 120 is advantageously efficient and transparent to the VMs 120 and related guest system software 127.

In one embodiment, the guest system software 127 and related applications, such as application 128, comprise a desktop environment that a user may invoke and access, for example via network port 116. The computer system 100 is configured to start VMs 120-1 through VM 120-$n$, which causes corresponding desktop environments to boot and become ready for access by users. Each VM 120 typically reads a substantially identical set of data blocks when booting the guest system software 127. In conventional systems, the identical blocks are redundantly requested, contributing to a "boot storm." In one or more embodiments of the present invention, however, redundant read requests are shortcut by a disk page tracker 170, described in greater detail below. Shortcut I/O requests are completed within the hypervisor 136 and, therefore, do not contribute additional I/O traffic.

Figure 2:
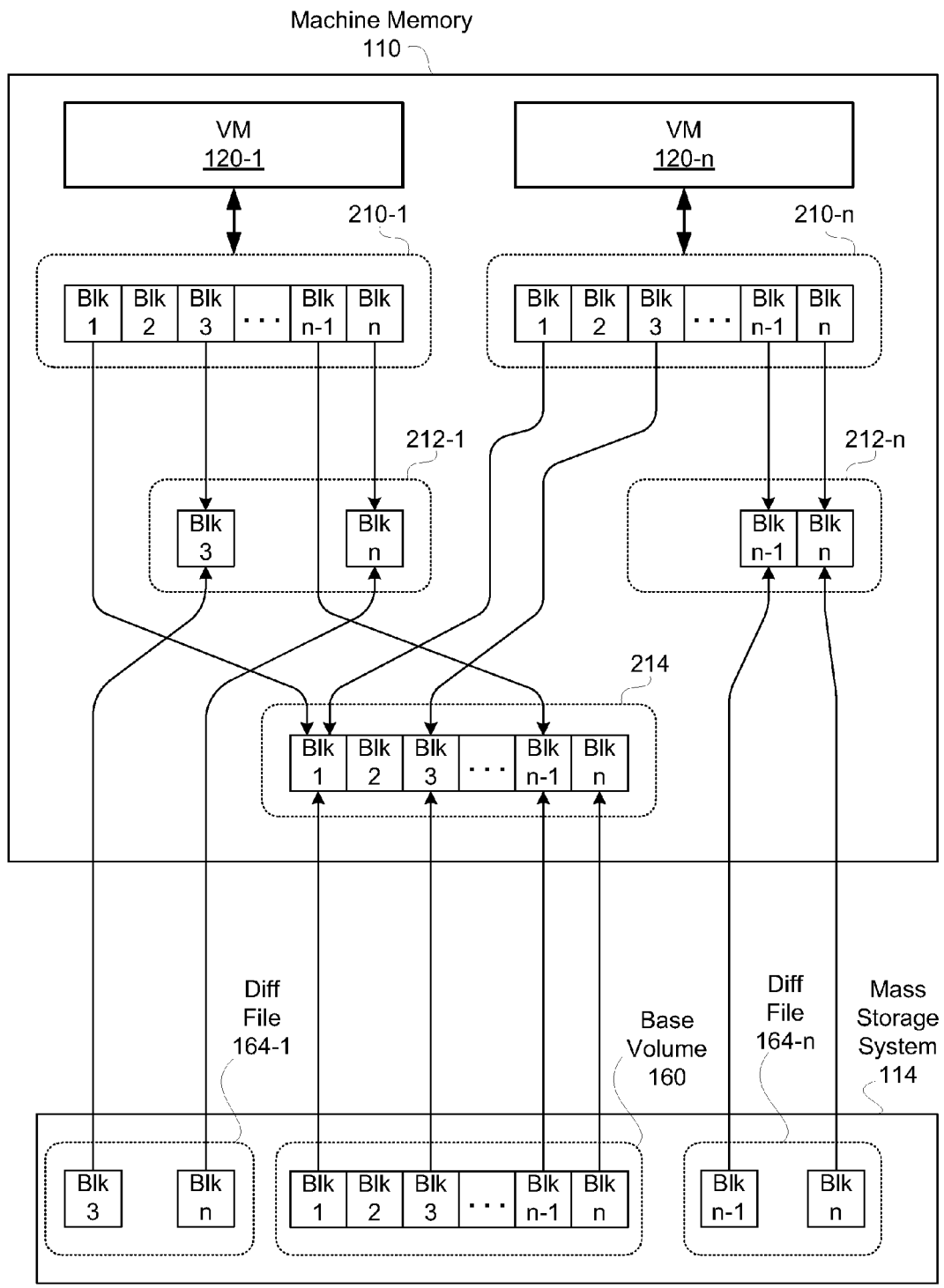
FIG. 2 illustrates a base volume and linked clones of the base volume, according to one embodiment of the invention.

FIG. 2 illustrates a base volume 160 and linked clones 210 of the base volume, according to one embodiment of the invention. The base volume 160 and difference files 164 reside on the mass storage system 114 of FIG. 1. Each difference file 164 stores specialized blocks for a corresponding VM 120. In one embodiment each difference file 164 comprises a random access file within a host file system; however, persons skilled in the art will recognize that other technically feasible means for representing specialized blocks associated with a particular VM 120 may also be implemented without departing the scope of the invention.

The base volume 160, or certain blocks thereof, may be represented in system memory 110 as a read-only common OS base disk 214, which linked clones 210 are configured to share as a root volume. In one embodiment, each linked clone 210 comprises a virtual disk volume with a block configuration that corresponds to the block configuration of the common OS base disk 214. Each unspecialized block within a given linked clone 210 corresponds to an equivalent block within the common OS base disk 214. Each specialized block within the linked clone 210 corresponds to a specialized block from an associated set of specialized blocks 212-1, 212-$n$.

For example, block "Blk 1" of linked clone 210-1 is unspecialized (has not been written by VM 120-1) and therefore corresponds to "Blk 1" of the common OS base disk 214.

Similarly, block "Blk n-1" of linked clone 210-1 is unspecialized and therefore corresponds to "Blk n-1" of the common OS base disk 214. However, blocks "Blk 3" and "Blk n" of linked clone 210-1 are specialized and therefore correspond to blocks "Blk 3" and "Blk n" of the set of specialized blocks 212-1. In one embodiment, blocks "Blk 3" and "Blk n" of the set of specialized blocks 212-1 are stored in difference file 164-1 within the mass storage system 114. In this example, "Blk 1" is not specialized for either linked clone 210-1 or 210-n. Because block "Blk 1" remains unspecialized with respect to each VM 120, only one instance of "Blk 1" is actually needed in machine memory 110. As described below, any blocks within the common OS base disk 214 that are unspecialized need only one instance in machine memory 110 when being read by an arbitrary number of VMs.

When a disk block is read from a target disk volume by a VM 120, sufficient storage within machine memory 110 is allocated to the VM 120 to receive the requested disk block prior to a read being posted to the target disk. The storage is allocated in the form of one or more machine pages, referenced by one or more associated MPNs. The disk page tracker 170 of FIG. 1 maintains a page tracking table 175 comprising entries that each reference a disk block identified by volume identifier and block offset. Each entry also includes an MPN and metadata associated with the disk block. An entry is added to the page tracking table 175 when a newly requested disk block represents a good candidate for sharing. For example, when a disk block resides on the base volume 160, that disk block is a good candidate for sharing. Blocks accessed once on the base volume 160 by one VM 120 tend to be accessed again by another VM 120. The page tracking table 175 is described in greater detail below in FIG. 4. The disk page tracker 170 is configured to track which disk blocks are being accessed by which VM 120, and to trigger MPN page sharing as described below. When disk block data residing in a memory page referenced by a shared MPN is written by an associated VM 120, the disk block is specialized for the VM 120 and the shared MPN is unshared to create a private MPN for the VM 120. The disk block may be specialized using any technically feasible technique and the shared MPN may be unshared using any technically feasible technique, such as any technically feasible variation of COW. The disk page tracker 170 comprises a set of procedures configured to execute in response to a disk block access request. Certain of the procedures are configured to maintain the page tracking table 175. Certain other procedures are configured to either generate an I/O request from an input request or to shortcut the I/O request and to generate an equivalent result without generating an I/O request. In one embodiment, certain procedures of the set of procedures may be implemented as callback functions registered to I/O request state for in-flight I/O requests.

In the embodiments illustrated herein, the size of a disk block and the size of a page in memory are the same. However, the invention is applicable to other embodiments where the size of the disk block and the size of a page in memory are not the same.

Figure 3A:
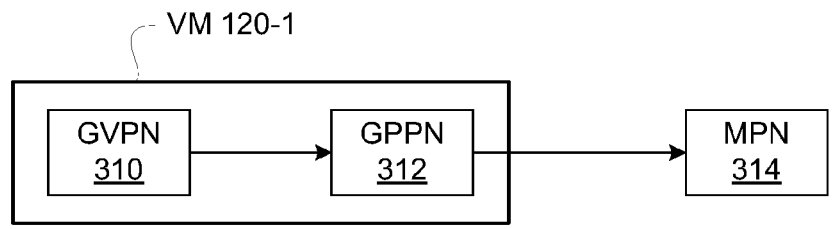
FIG. 3A illustrates a memory mapping from a guest virtual page number (GVPN) within a virtual machine (VM) to a machine page number (MPN) via a guest physical page number (GPPN), according to one embodiment of the invention.

FIG. 3A illustrates a memory mapping from a guest virtual page number (GVPN) 310 within a VM 120-1 to an MPN 314 via a GPPN 312, according to one embodiment of the invention. Each page number corresponds to a page of memory within a contiguous range of pages of memory. The GVPN 310 corresponds to a page of memory within a range defined by a guest virtual address space. The GVPN 310 is mapped to GPPN 312 by the guest OS 124 of FIG. 1. The GPPN 312 corresponds to a page of memory within a range defined by a guest physical address space, which the guest OS 124 treats as a private physical address space. However, the GPPN 312 is further mapped into MPN 314 by the hypervisor 136. The MPN 314 corresponds to a page of machine memory 110, which is actual memory circuitry, such as a dynamic random access memory (DRAM), configured to store pages of data comprising the machine memory 110.

After a block of data that is a candidate for sharing is read from a disk volume, the block of data resides in a page of memory referenced by MPN 314, which is mapped as a read-only page by each associated GPPN. A block of data that is not a candidate for sharing may be stored in a page of memory referenced by an MPN configured for read/write access.

Figure 3B:
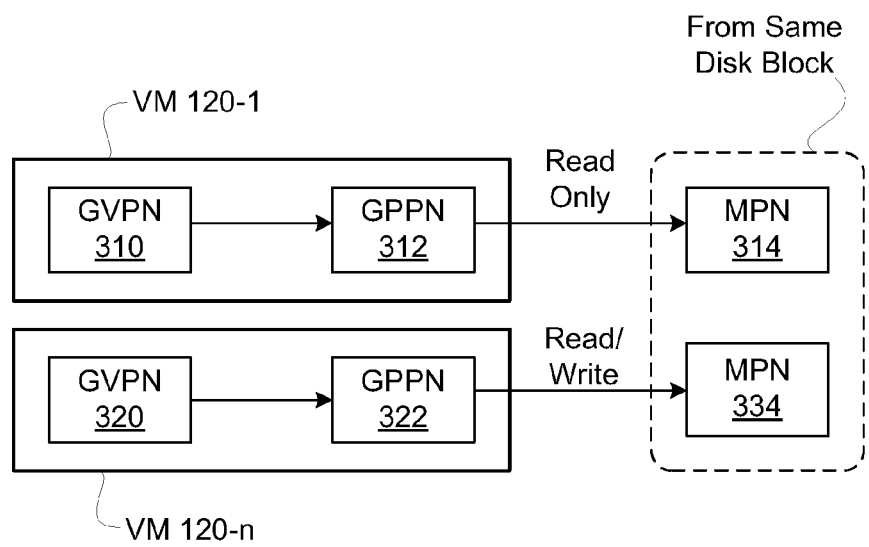
FIG. 3B illustrates a second memory mapping from a second GVPN within a second VM to a second MPN via a second GPPN, according to one embodiment of the invention.

FIG. 3B illustrates a second memory mapping from a second GVPN 320 within a second VM 120-n to a second MPN 334 via a second GPPN 322, according to one embodiment of the invention. A second page corresponding to MPN 334 is allocated and mapped to GVPN 320 via GPPN 322 prior to a read being posted to retrieve a corresponding disk block. At this point the guest OS 124 is managing GPPN 322 as a disk cache for related file data. In this scenario, MPN 314 and MPN 334 both correspond to the same volume and disk block within the volume, and the disk page tracker 170 of FIG. 1 identifies a pending disk block requested for MPN 334 as the same disk block previously retrieved into a page of memory referenced by MPN 314. Therefore, rather than posting a read request to retrieve the corresponding disk block from the mass storage device 114, GPPN 322 is instead remapped to share MPN 314. MPN 334 is then released, as shown below in FIG. 3C.

Figure 3C:
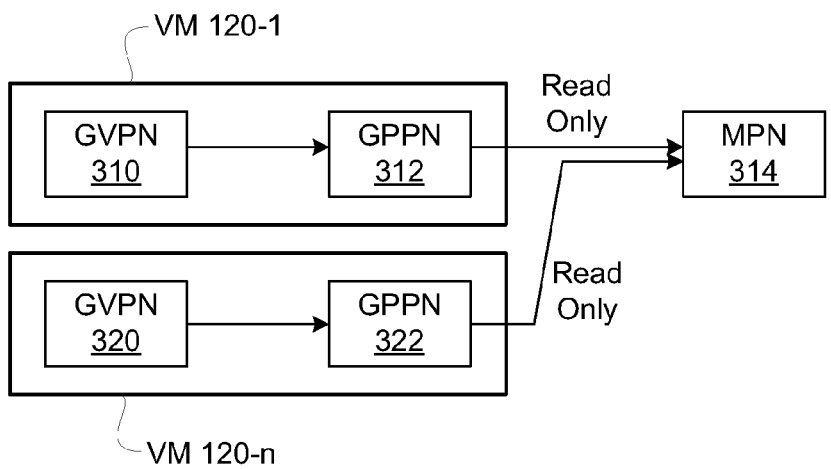
FIG. 3C illustrates a "flip" operation whereby the second GPPN is remapped to the first MPN for sharing and the second MPN is released, according to one embodiment of the invention.

FIG. 3C illustrates a "flip" operation whereby the second GPPN 322 is remapped to the first MPN 314 for sharing and the second MPN 334 is released, according to one embodiment of the invention. By remapping GPPN 322 to MPN 314, the end effect of posting a disk read to retrieve data associated with GPPN 322 is accomplished without actually posting the disk read request or generating related I/O traffic. In this way, the hypervisor 136 of FIG. 1 may shortcut I/O requests by mapping their corresponding destination GPPN to a known page resident in machine memory 110. When a VDI system is executing a plurality of desktop environment instances, a significant portion of the disk blocks retrieved from the base volume 160 to boot each instance are likely to be stored in pages referenced by shared MPNs, which reduces overall memory pressure on the machine memory 110.

Figure 3D:
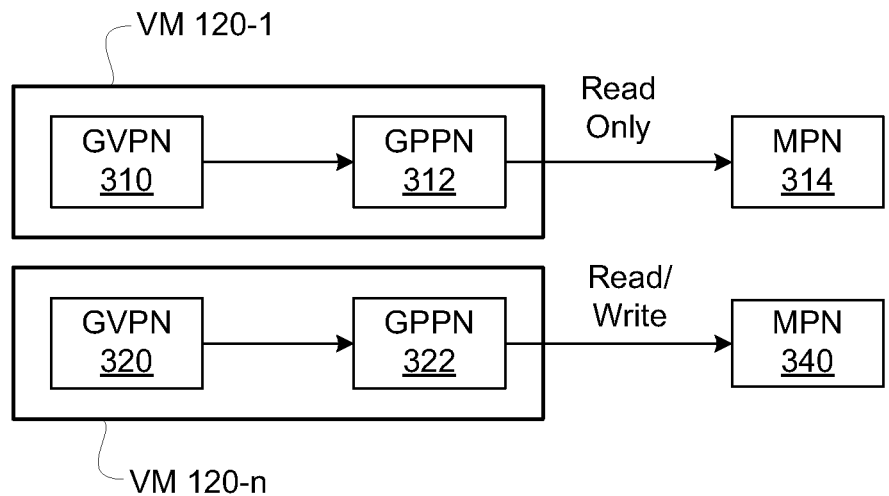
FIG. 3D illustrates a copy-on-write remapping of the shared MPN to a private MPN for the second VM, according to one embodiment of the invention.

FIG. 3D illustrates a copy-on-write remapping of the shared MPN 314 to a private MPN 340 for the second VM 120-n, according to one embodiment of the invention. If VM 120-n attempts to write GPPN 322, previously mapped to MPN 314 in FIG. 3C, a COW operation is performed and GPPN 322 is remapped to private MPN 340. The private MPN 340 is needed to receive the write data. A corresponding disk block is also specialized using any technically feasible technique to preserve the data resident in a page of memory referenced by MPN 340 for future access from the mass storage system 114.

Figure 3E:
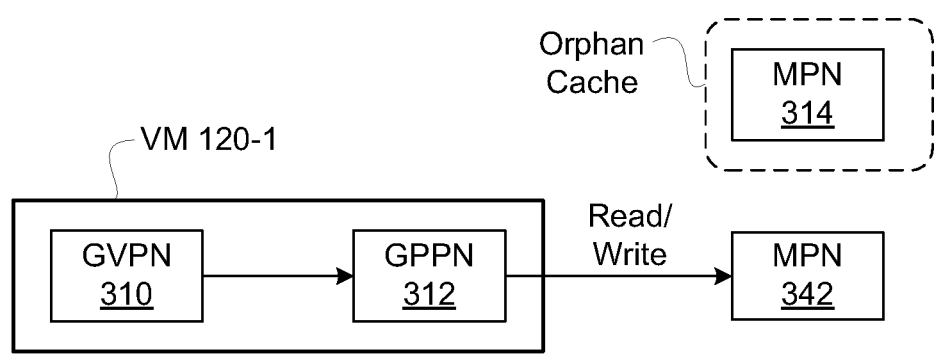
FIG. 3E illustrates the shared MPN being orphaned as a result of a copy-on-write remapping triggered by the first VM, according to one embodiment of the invention.

FIG. 3E illustrates the shared MPN 314 being orphaned as a result of a copy-on-write remapping triggered by the first VM 120-1, according to one embodiment of the invention. If VM 120-1 attempts to write GPPN 312, previously mapped to MPN 314 in FIG. 3D, a COW operation is performed and GPPN 312 is remapped to private MPN 342. The private MPN 342 is needed to receive the write data.

The previously shared MPN 314 is orphaned in an orphan cache 139, configured to reference and therefore retain MPNs corresponding to previously shared disk blocks deemed likely candidates for future sharing. The orphan cache 139 retains disk blocks that may be accessed at some point in the future by a VM 120, although no VM 120 is currently accessing the blocks. As the number of MPNs referenced by the orphan cache 139 grows, a replacement policy may evict certain cache entries to make space for new cache entries. Any technically feasible replacement policy, such as a least recently used (LRU) policy, may be used to initiate eviction of cache entries from the orphan cache 139. In one embodiment, a disk block is deemed a likely candidate for sharing if the disk block resides on a shared base volume. In another embodiment, a disk block is deemed a likely candidate for sharing if the disk block is characterized as meeting or exceeding a certain threshold value for a disk block reference count, supplied by a file system that is configured to track disk block reference counts. The threshold may be as low as two, or arbitrarily high. The file system may track disk block reference counts using any technically feasible technique. Persons skilled in the art will recognize that other techniques for characterizing a disk block as being a likely candidate for sharing may be utilized without departing the scope of the present invention.

FIG. 4 illustrates a page tracking table 175 configured to include at least a reference count 414 and a pending status bit 416 for each tracked page, according to one embodiment of the invention. The page tracking table 175 associates a specified disk block with a particular target reference 410, comprising a volume identifier (baseDisk) and block offset (Offset) with an MPN 412. In another embodiment, physical disk locations of disk blocks may be tracked directly without using references to volume identifiers or block offsets. Therefore, the target reference 410 represents a unique disk block within the mass storage system 114 of FIG. 1 or any other storage system coupled to the computer system 100. The MPN 412 represents data from the unique disk block as being resident in machine memory. In one embodiment, each disk block represented within the page tracking table 175 has been characterized as likely to be shared. Other blocks are not represented within the page tracking table 175.

The MPN 412 is characterized by the reference count 414, which indicates how many guest physical pages are mapped into the MPN 412. The MPN 412 is also characterized by the pending status bit 416, which indicates that a corresponding disk block request is currently in flight but has not yet completed. The pending status bit 416 allows the hypervisor 136 to avoid launching an additional request to a disk block that has already been requested but is not yet resident within machine memory. In one embodiment, a first request to a particular disk block results in a reference count 414 being set to two, indicating that one guest physical page is mapped to the corresponding MPN 412, and the orphan cache 139 is otherwise retaining the MPN 412. When a second guest physical page is mapped to the same MPN 412, the reference count is set to three. When no guest physical page is currently mapped to the MPN 412, the reference count is set to one, indicating the orphan cache 139 is retaining the MPN 412. In each case, the MPN 412 is mapped read-only. When the orphan cache 139 needs to evict a specific MPN, the orphan cache 139 remove its reference to the MPN, reducing the reference count for the MPN to zero, thereby allowing the page of memory referenced by the MPN to be reclaimed. Persons skilled in the art will recognize that the above assigned meanings of reference count values are exemplary and other systems of reference count values may be implemented without departing the scope of the present invention.

Figure 5:
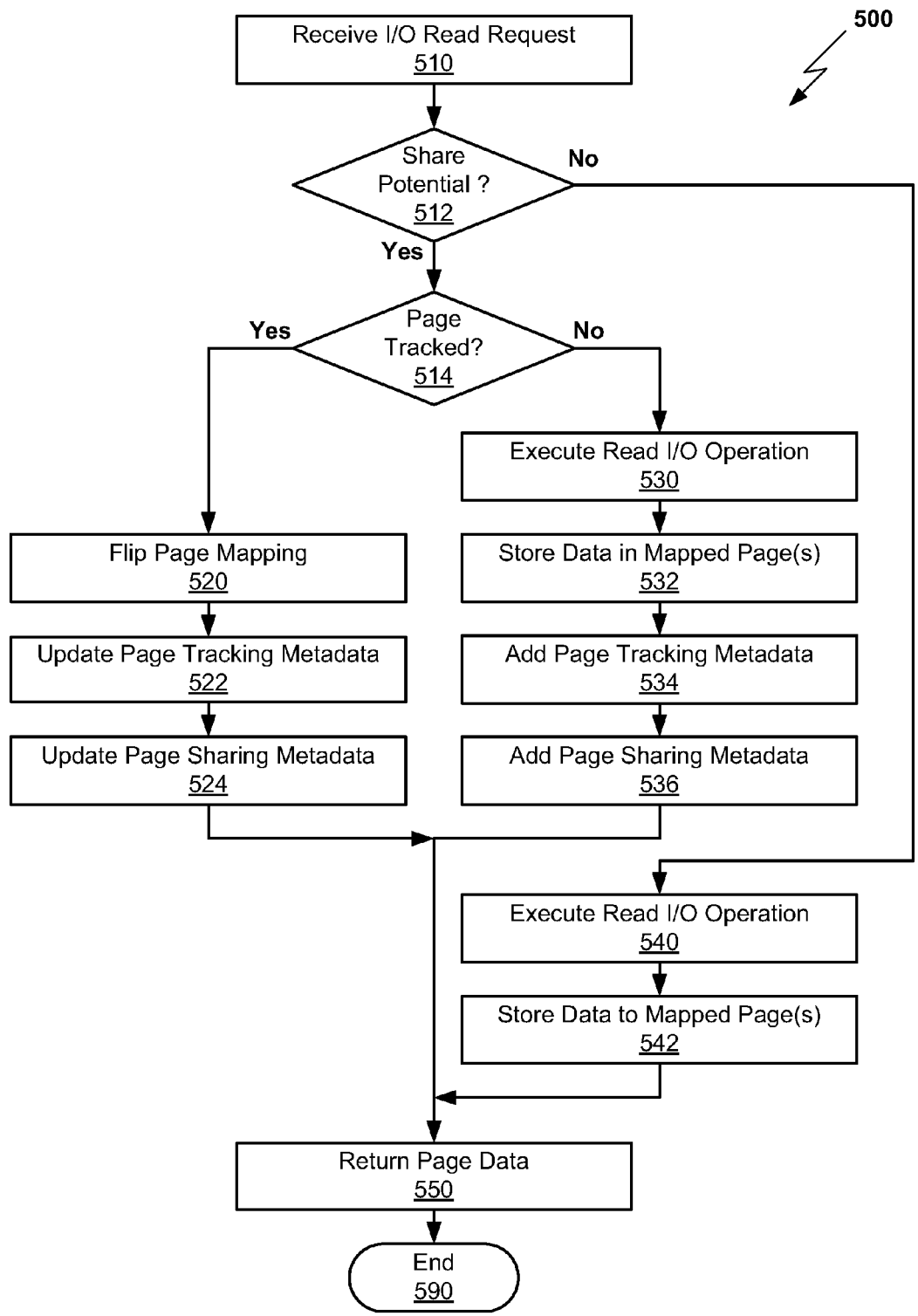
FIG. 5 is a flow diagram of method steps, performed by a hypervisor, for tracking and shortcutting input/output requests, according to one embodiment of the invention.

FIG. 5 is a flow diagram of method steps 500, performed by a hypervisor, for tracking and shortcutting input/output requests, according to one embodiment of the invention. Although the method steps are described in conjunction with the system of FIGS. 1 through 4, persons skilled in the art will understand that the method steps carried out in any system are within the scope of the invention.

The method begins in step 510, where the hypervisor 136 receives an I/O read request for a disk block, comprising a volume identifier, such as a disk identifier, and a block offset into the volume. The I/O read request typically originates from a VM 120.

If, in step 512, the requested disk block has a sufficient likelihood of being shared, then the method proceeds to step 514. In one embodiment, if the requested disk block resides on a shared base disk, such as base volume 160, then the requested disk block is deemed to have sufficient likelihood of being shared. In an alternative embodiment, if the request disk block is characterized as exceeding a certain threshold value for a disk block reference count, supplied by a file system that is configured to track disk block reference counts, then the requested disk block is deemed to have sufficient likelihood of being shared.

If, in step 514, the requested disk block is tracked by the page tracking table 175, then the method proceeds to step 520. The requested disk block is determined to be tracked if the requested disk block is represented by an entry in the page tracking table 175. The requested disk block is tracked but pending if the pending status bit 416.

In step 520, the hypervisor 136 flips the page mapping of the GPPN allocated for the requested disk block to map to the MPN of a corresponding tracked MPN, indicated in the page tracking table 175. In step 522, the page tracking metadata is updated to reflect an incremented reference count 414. In step 524 page sharing metadata is updated, for example, to inform the sharing module 138 that an additional GPPN is mapped to the shared MPN. Any technically feasible page sharing mechanism may be implemented by the sharing module 138 without departing the scope of the present invention.

In step 550, the method returns requested page data in the form of a mapped MPN. In one embodiment, if the pending status bit 416 for the corresponding page is still set then the method waits until the pending status bit is cleared before returning. The method terminates in step 590.

Returning to step 514, if the requested disk block is not tracked by the page tracking table 175, then the method proceeds to step 530, where the hypervisor 136 initiates execution of a read input/output operation to retrieve the requested disk block from mass storage system 114. In step 532, data for the requested disk block is stored in a corresponding mapped MPN(s). In step 534, an entry is added to the page tracking table 175, with page tracking metadata comprising target reference 410, MPN 412, reference count 414, and a pending status bit 416. In one embodiment, the initial value of reference count 414 is set to two. The pending status bit 416 is set to one until requested block data is written to completion in the page of memory referenced by MPN 412, after which the pending status bit 416 is cleared. In step 536 the MPN 412 is marked for sharing to the sharing module 138 and any implementation-specific metadata is added for MPN 412. In one embodiment, the GPPN mapped to MPN 412 and the associated VM identifier are added to a data structure (e.g., queue or list) containing page sharing hints. This data structure is maintained by the sharing module 138, and used by the sharing module 138 to select candidate pages for sharing.

Returning to step 512, if the requested disk block does not have a sufficient likelihood of being shared, then the method proceeds to step 540, where the hypervisor 136 initiates execution of a read input/output operation to retrieve the requested disk block from mass storage system 114. In step 542, data for the requested disk block is stored in a corresponding mapped MPN(s).

An alternative embodiment is described below in FIGS. 6A-6B and 7. In the alternative embodiment, each requested disk block that is a candidate for sharing is read and stored as a read-write block mapped into a GPPN within a VM originating the request. Prior to returning, however, a copy is made of a corresponding MPN and placed into the orphan cache 139. In this way, if the VM originating the request attempts to write the MPN soon after the MPN was read, a relatively expensive write fault is avoided. GPPN and its associated VM identifier may be added to a page sharing hint data structure, which is later used by the sharing module 138 to find page sharing opportunities, to thereby reducing overall memory pressure. If a subsequent I/O request is a match for the MPN copy within the orphan cache 139, then the I/O request may be shortcut and served by the orphan cache 139. In another alternative embodiment, one or more MPNs are added to a page sharing hint data structure, and a back map from the MPNs to the GPPNs is used by the sharing module 138 to enable sharing of one or more MPNs by two or more GPPNs.

Figure 6A:
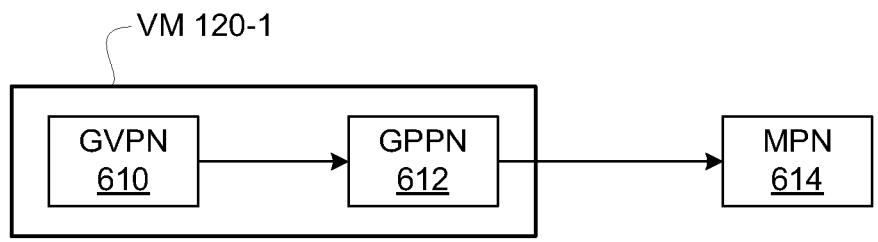
FIG. 6A illustrates a memory mapping from a GVPN within a virtual machine to an MPN associated with an input/output read request, according to one embodiment of the invention.

FIG. 6A illustrates a memory mapping from a GVPN 610 within a virtual machine 120-1 to an MPN 614 associated with an input/output read request, according to one embodiment of the invention. The GVPN 610 is mapped via a GPPN 612 to the MPN 614. After an associated disk block of data that is a candidate for sharing is read from a disk volume, the block of data resides in a page of memory referenced by MPN 614, and the mapping from GPPN 612 to MPN 614 is marked with a read-write attribute. Prior to returning from the read request, the hypervisor 136 copies the data associated with MPN 614 to create a copy of the page of memory associated with MPN 614 in the orphan cache 139.

Figure 6B:
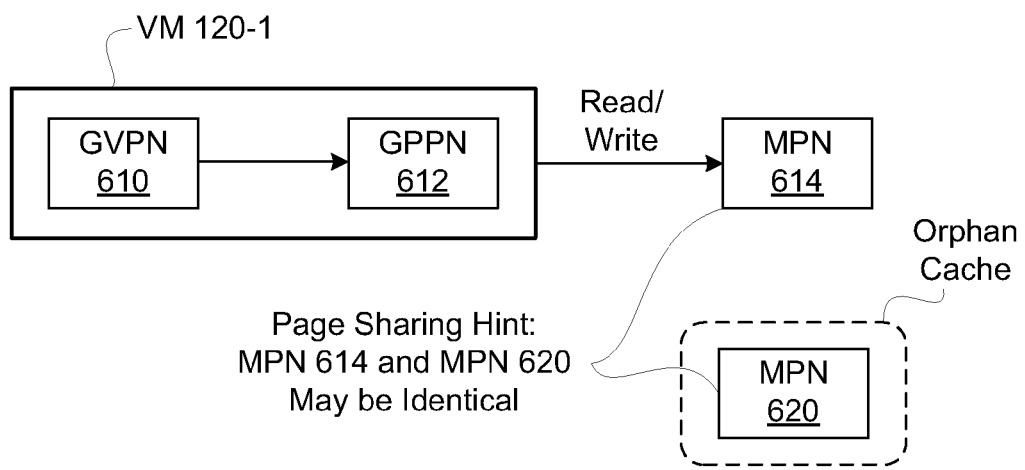
FIG. 6B illustrates a copy operation of a requested block of data associated with one MPN to another MPN, according to one embodiment of the invention.

FIG. 6B illustrates a copy operation of a requested block of data associated with one MPN 614 to another MPN 620, according to one embodiment of the invention. The contents of MPN 614, which are otherwise privately mapped to GPPN 612, are copied to MPN 620, which resides within the orphan cache 139. A reference to MPN 620, along with at least a target reference 410, reference count (initially equal to "1") and pending bit are added to the page tracking table 175. In one embodiment, GPPN 612 and its associated VM identifier are added to the page sharing hint data structure. They are removed from the page sharing hint data structure when GPPN 612 is modified. The page sharing mechanism implemented by the sharing module 138 first reads the page sharing hint data structure and looks for candidate pages for sharing prior to any other sharing activity. The page sharing mechanism may be implemented using any technically feasible technique without departing the scope of the present invention. For example, the page sharing mechanism may be a daemon or background service that identifies candidate pages for sharing, hashes the contents of the page, and compares the hash value to an existing hash table. As each page is hashed, it may be added to the hash table. Pages may be identified for sharing using any technique, including randomly. When a matching hash is identified, the corresponding page is shared with the candidate page by remapping the related GPPN to a common MPN and releasing the redundant MPN. The page sharing mechanism may receive hints from other processes. If the contents of the hinted pages are identical, then they may be immediately shared rather than waiting to be randomly discovered. Details of this mechanism are described in U.S. Pat. Nos. 6,789,156 and 7,620,766, previously incorporated by reference.

Because MPN 620 was deemed likely to be shared, it is at least temporarily held in the orphan cache 139, allowing another VM 120 an opportunity to request MPN 620 and other MPNs within the orphan cache 139. Each time a VM 120 is able to retrieve a disk block of data from machine memory 110 (cache) an input/output operation is shortcut and I/O resources are preserved.

Figure 7:
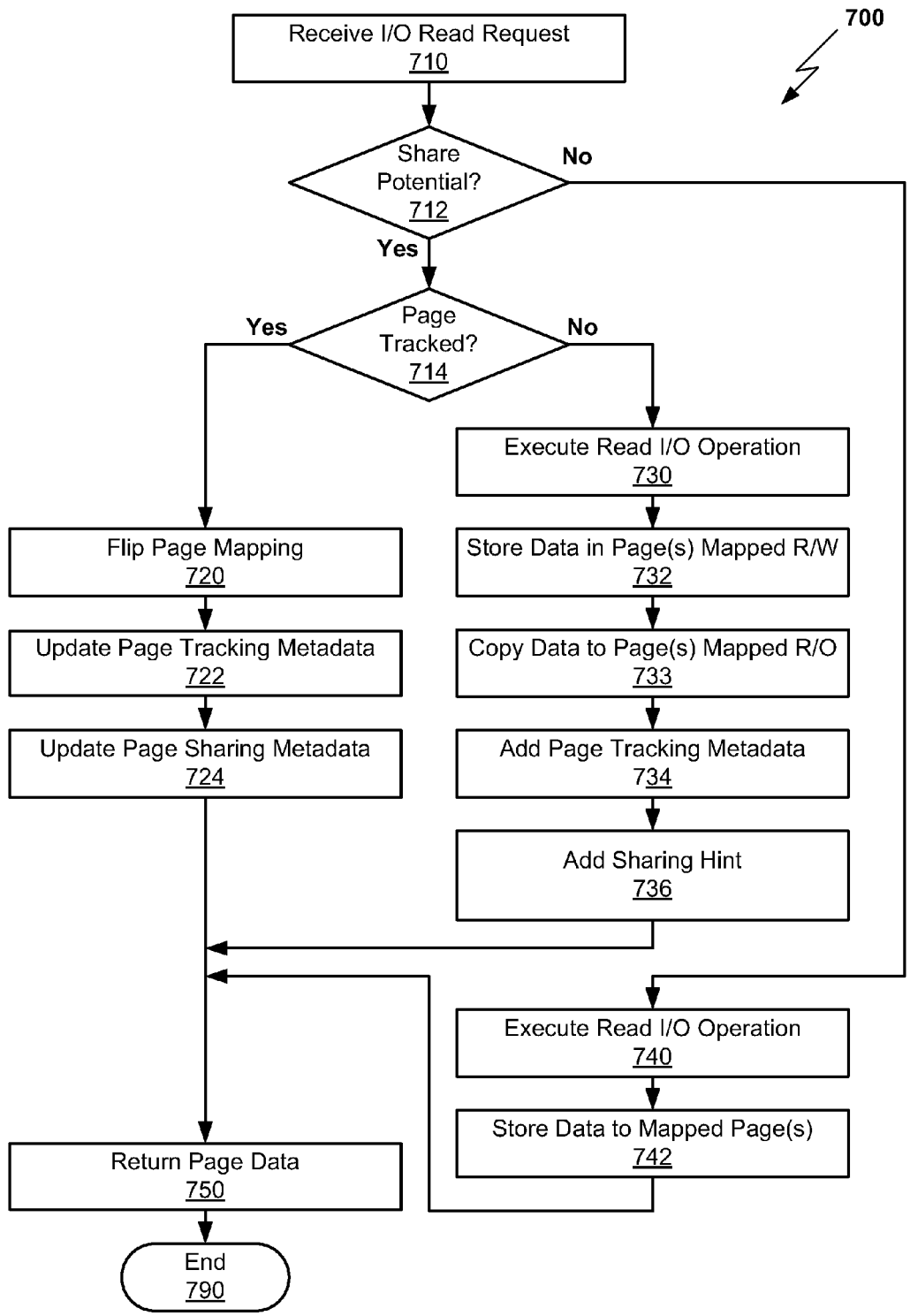
FIG. 7 is a flow diagram of method steps, performed by a hypervisor, for tracking and shortcutting input/output requests, according to one embodiment of the invention.

FIG. 7 is a flow diagram of method steps 700, performed by a hypervisor, for tracking and shortcutting input/output requests, according to the embodiment of the invention described in conjunction with FIGS. 6A-6B. Although the method steps are described in conjunction with the system of FIGS. 1 through 4, persons skilled in the art will understand that the method steps carried out in any system are within the scope of the invention.

The method begins in step 710, where the hypervisor 136 receives an I/O read request for a disk block, comprising a volume identifier, such as a disk identifier, and a block offset into the volume. The I/O read request typically originates from a VM 120.

If, in step 712, the requested disk block has a sufficient likelihood of being shared, then the method proceeds to step 714. In one embodiment, if the requested disk block resides on a shared base disk, such as base volume 160, then the requested disk block is deemed to have sufficient likelihood of being shared. In an alternative embodiment, if the request disk block is characterized as exceeding a certain threshold value for a disk block reference count, supplied by a file system that is configured to track disk block reference counts, then the requested disk block is deemed to have sufficient likelihood of being shared.

If, in step 714, the requested disk block is tracked by the page tracking table 175, then the method proceeds to step 720. The requested disk block is determined to be tracked if the requested disk block is represented by an entry in the page tracking table 175. The requested disk block is tracked but pending if the pending status bit 416.

In step 720, the hypervisor 136 flips the page mapping of the GPPN associated with the requested disk block to map to the MPN of a corresponding tracked MPN, indicated in the page tracking table 175. In step 722, the page tracking metadata is updated to reflect an incremented reference count 414. In step 724 page sharing metadata is updated, for example, to inform the sharing module 138 that an additional GPPN is mapped to the shared MPN.

In step 750, the method returns requested page data in the form of a mapped MPN. In one embodiment, if the pending status bit 416 for the corresponding page is still set then the method waits until the pending status bit is cleared before returning. The method terminates in step 790.

Returning to step 714, if the requested disk block is not tracked by the page tracking table 175, then the method proceeds to step 730, where the hypervisor 136 initiates execution of a read input/output operation to retrieve the requested disk block from mass storage system 114. In step 732, data for the requested disk block is stored in a corresponding read-write mapped MPN(s). In step 733, data associated with the read-write mapped MPN is copied to a page of memory referenced by a second MPN, which is then mapped for read-only access. In step 734, an entry is added to the page tracking table 175, with page tracking metadata comprising target reference 410, MPN 412 (references MPN mapped for read-only access), reference count 414, and a pending status bit 416. In one embodiment, the initial value of reference count 414 is set to two. The pending status bit 416 is set to one until requested block data is written to completion in the page of memory referenced by MPN 412, after which the pending status bit 416 is cleared. In step 736 the GPPN associated with the requested disk block and the associated VM identifier are added to the page sharing hint data structure.

Returning to step 712, if the requested disk block does not have a sufficient likelihood of being shared, then the method proceeds to step 740, where the hypervisor 136 initiates execution of a read input/output operation to retrieve the requested disk block from mass storage system 114. In step 742, data for the requested disk block is stored in one or more pages of memory referenced by the corresponding mapped MPN(s).

In sum, a technique for shortcutting input/output operations for commonly requested blocks of data is disclosed. A page tracking table maintains associations between disk blocks and machine page numbers. Disk blocks that are likely to be shared are tracked in the page tracking table, while others need not be tracked. When a request is received for a tracked disk block, the data is presented to a requesting VM by remapping a page allocated within the VM for the requested block. In this way, the outcome of the input/output request is achieved transparently with respect to the requesting VM. Disk blocks are deemed likely to be shared based on any technically feasible criteria, such as a disk volume identifier or a disk block reference count.

One advantage of the present invention is that input/output operations may be reduced transparently with respect to guest VMs. One additional advantage is that only a small portion of additional machine memory is needed because additional instances of disk block data are minimized through sharing.

In the embodiments of the invention described herein, "virtual" in the context of a virtualized system means guest virtual, as in GVPN, or guest physical, as in GPPN, and in the context of a non-virtualized system, means just virtual, as in VPN.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of processing read I/O requests in a computer system having applications running therein, the applications including virtual memory pages mapped to machine memory pages, the method comprising:

maintaining a tracking data structure for a first group of machine memory pages, each having at least two virtual memory pages mapped thereto, and a second group of machine memory pages, each having only one virtual memory page mapped thereto, the tracking data structure indicating, for each of said machine memory pages, a corresponding location in a storage volume from which its contents were read or are being read;

receiving a read request;

identifying a first location of the storage volume indicated in the read request;

calculating, using the tracking data structure, a likelihood that the first location of the storage volume will be shared;

determining that the likelihood exceeds a threshold value;

based on the determination that the likelihood exceeds the threshold value;

determining, using the tracking data structure, that a machine memory page in the first group or the second group contains or will contain data stored in the first location of the storage volume indicated in the read request;

based on the determination that a machine memory page in the first group or the second group contains or will contain data stored in a location of the storage volume indicated in the read request, determining not to process the read request; and based on the determination to not process the read request, mapping a virtual memory page associated with the read request to the machine memory page; and in response to a first memory write request, copying the contents of a machine memory page in the first group to a first machine memory page, and mapping a virtual memory page associated with the first memory write request to the first machine memory page; and in response to a second memory write request, copying the contents of a machine memory page in the second group to a second machine memory page, and mapping a virtual memory page associated with the second memory write request to the second machine memory page.

2. The method of claim 1, wherein the applications are instances of virtual machines and the virtual memory pages are guest physical memory pages.

3. The method of claim 1, wherein the tracking data structure indicates, for each of said machine memory pages, a reference count indicating how many virtual memory pages are mapped to the machine memory page, and, in response to said read request, the reference count associated with the machine memory page in the first group or the second group is incremented.

4. The method of claim 3, wherein, in response to said first memory write request, the reference count associated with the machine memory page in the first group is decremented, and, in response to said second memory write request, the reference count associated with the machine memory page in the second group is decremented.

5. The method of claim 4, further comprising:
updating the tracking data structure by deleting one or more of entries of the tracking data structure that correspond to the machine memory pages that have no virtual memory pages mapped thereto.

6. The method of claim 1, wherein at least one of the machine memory pages in the first and second groups is a target memory location of a read request issued to the storage volume and completed.

7. The method of claim 1, wherein at least one of the machine memory pages in the first and second groups is a target memory location of a read request issued to the storage volume and currently in process.

8. The method of claim 1, wherein calculating a likelihood that the first location of the storage volume will be shared is based on a location of the first location of the storage volume.

9. The method of claim 1, wherein calculating a likelihood that the first location of the storage volume will be shared is based on a number of times the first location of storage volume has been requested.

10. A method of processing read I/O requests in a computer system having applications running therein, the applications including virtual memory pages mapped to machine memory pages, the method comprising:
maintaining a tracking data structure for a first group of machine memory pages, each having at least two virtual memory pages mapped thereto, a second group of machine memory pages, each having only one virtual memory page mapped thereto, and a third group of machine memory pages, each having no virtual memory pages mapped thereto, the tracking data structure indicating, for each of said machine memory pages, a corresponding location in a storage volume from which its contents were read or are being read, and a reference count indicating how many virtual memory pages are mapped to the machine memory page;

receiving a read request;

identifying a first location of the storage volume indicated in the read request;

calculating, using the tracking data structure, a likelihood that the first location of the storage volume will be shared;

determining that the likelihood exceeds a threshold value; and based on the determination that the likelihood exceeds the threshold value, mapping a virtual memory page associated with the read request to a machine memory page in one of the first, second, and third groups, and incrementing the reference count associated with the machine memory page.

11. The method of claim 10, wherein at least one of the machine memory pages in the first, second, and third groups is a target memory location of a read request issued to the storage volume and completed.

12. The method of claim 10, wherein at least one of the machine memory pages in the first, second, and third groups is a target memory location of a read request issued to the storage volume and currently in process.

13. The method of claim 10, further comprising:
updating the tracking data structure to delete one or more entries associated with the machine memory pages in the third group.

14. The method of claim 10, wherein, in response to a memory write request, copying the contents of a machine memory page in one of the first and second groups to a new machine memory page, and mapping a virtual memory page associated with the memory write request to the new machine memory page.

15. A method of processing read I/O requests in a computer system having virtual machines running therein, the virtual machines including guest virtual memory pages mapped to machine memory pages via guest physical memory pages, the method comprising:
maintaining a tracking data structure for a set of machine memory pages, the tracking data structure indicating, for each of said machine memory pages, a corresponding location in a storage volume from which its contents were read or are being read, a reference count indicating how many virtual memory pages are mapped to the machine memory page, and a pending status flag indicating whether or not a read from the storage volume is pending;

receiving a read request;

identifying a first location of the storage volume indicated in the read request;

calculating, using the tracking data structure, a likelihood that the first location of the storage volume will be shared;

determining that the likelihood exceeds a threshold value; and based on the determination that the likelihood exceeds the threshold value;
determining, using the tracking data structure, if one of the machine memory pages being tracked contains or will contain data stored in a location of the storage volume indicated in the read request;

based on the determination one of the machine memory pages being tracked contains or will contain data stored in a location of the storage volume indicated in the read request, determining not to process the read request; and based on the determination to not process the read request, mapping a guest physical memory page associated with the read request to the machine memory page; and if there is no machine memory page being tracked that contains or will contain data stored in a location of the storage volume indicated in the read request, issuing a request to the storage volume for the data stored in the first location of the storage volume indicated in the read request, mapping a guest physical memory page associated with the read request to the machine memory page in which the requested data will be stored, and adding a new entry to a data structure containing page sharing hints, the new entry identifying the guest physical memory page associated with the read request and the virtual machine associated with the guest physical memory page.

16. The method of claim 15, further comprising:

adding a new entry to the tracking data structure corresponding to the machine memory page in which the requested data will be stored, the new entry including the location of the storage volume indicated in the read request, a reference count indicating that one guest physical memory pages is mapped to the machine memory page, and a pending status flag that is set to indicate whether a read from the storage volume is pending or has completed.

17. A computer system comprising:

a host platform for virtual machines; and a storage volume connected thereto, the host platform for virtual machines including one or more processors and machine memory, the machine memory having stored therein a tracking data structure for a first group of machine memory pages, each having at least two virtual memory pages mapped thereto, a second group of machine memory pages, each having only one virtual memory page mapped thereto, and a third group of machine memory pages, each having no virtual memory pages mapped thereto, the tracking data structure indicating, for each of said machine memory pages, a corresponding location in a storage volume from which its contents were read or are being read, and a reference count indicating how many virtual memory pages are mapped to the machine memory page, and a pending status flag indicating whether or not a read from the storage volume is pending, wherein a read request issued by any of the virtual machines is conditionally issued to the storage volume based on the tracking data structure; and wherein the one or more processors are programmed to:
receiving a read request;
identifying a first location of the storage volume indicated in the read request;
calculating, using the tracking data structure, a likelihood that the first location of the storage volume will be shared;
determining that the likelihood exceeds a threshold value; and
based on the determination that the likelihood exceeds the threshold value, map a virtual memory page associated with the read request to a machine memory page in one of the first, second, and third groups.

18. The computer system of claim 17, wherein the processors are programmed to process read requests issued by the virtual machines and, prior to issuing a read request, to check the tracking data structure to determine whether there exists a machine memory page that contains or will contain data from a location in the storage volume that is the same as indicated in the read request.

19. The computer system of claim 17, wherein the processors are programmed to map a virtual memory page to a machine memory page and increment the reference count associated with the machine memory page if it is determined that the machine memory page contains or will contain data from a location in the storage volume that is the same as indicated in the read request.

20. The computer system of claim 19, wherein the processors are further programmed to copy the contents of a shared machine memory page to a new machine memory page in response to a request to write to the shared machine memory page and decrement the reference count associated with the shared machine memory page.

* * * * *